UNITED STATES PATENT OFFICE

THEODORE G. SULLIVAN, OF RUTHERFORD, NEW JERSEY

MAKING OF RUBBER COLORING MATERIAL

No Drawing. Application filed March 26, 1931. Serial No 525,626.

This invention relates to the making of rubber coloring material.

One important object of the invention is to provide a novel process of manufacturing rubber coloring material wherein the pigment will be in colloidal dispersion throughout the material so that it may be blended uniformly with the rubber which it is desired to color.

A second important object of the invention is to provide a novel process for producing rubber coloring material wherein all forms of pigments, both organic and inorganic may be used.

A third important object of the invention is to provide a novel process for manufacturing rubber coloring material whereby a coloring material is produced directly in the rubber which is suitable for use in the manufacture of all kinds of rubber goods in which artificial coloring is desirable.

A fourth important object of the invention is to provide a novel process for producing rubber coloring material especially adapted for use in coloring such goods as raincoats, bathing caps, shoes, insulation for wire, sheeting, inner tubes, tires and the like.

A fifth important object of the invention is to produce a novel coloring matter.

As one process for preparing such coloring material a rubber color intermediate, such as Victoria blue base for instance, is intimately mixed with an equal quantity of rubber in any suitable manner such as in a mill, a Banbury mixer, rubber cement churn or the like. Next there is taken a color intermediate complementary to the color intermediate above mentioned which complementary color intermediate is phospho-tungstic acid, $$P_2O_5 \cdot 12WO_3 \cdot 42H_2O$$

in the case of Victoria blue or one to form a salt or ester acid producing an insoluble toner by intermediate condensation. This is then intimately mixed with an equal quantity of rubber by any suitable means as indicated above. The two batches thus prepared are now mixed intimately together and this mixing causes the resultant pigment to be precipitated in a state of colloidal dispersion, each particle being surrounded by a protective coating of rubber which thus prevents agglomeration and consequent inequality of tone. This composition is sheeted and dried on an ordinary rubber sheeting mill and is then ready for use in the manufacture of rubber goods, being mixed with the rubber from which such goods are to be manufactured in sufficient quantity to produce the required shade.

A second manner of carrying the process into execution is as follows:—One part of rubber color, either dry or in a pulp form (figured on a dry basis) is mixed thoroughly with water to form a light slurry, a trace of casein or other protective colloid being added in the case of pigments which tend to agglomerate. This slurry is then mixed with one part of latex, dispersed rubber or other aqueous solution of rubber (figured on a dry basis). The mixture is then agitated and ground to impalpable fineness in any suitable form of wet grinder and is dried. Finally the dried mass is sheeted on a rubber sheeting mill and is ready for use as in the previous case.

As used in the claims hereto appended the term "rubber" is intended to cover all substances such as latex, crepe rubber, sheet rubber, milled rubber and the like which are derived from the rubber tree and plants of like general character.

There has thus been provided a highly efficient rubber coloring composition and a novel process for producing the same.

It is obvious that changes may be made in the form and construction of the invention without departing from the principles thereof. It is not, therefore, desired to confine the invention to the exact form herein shown and described but it is desired to include all such as come within the scope claimed.

I claim:—

1. That process of producing a coloring compound for rubber manufactures which consists in mixing a color intermediate with rubber in equal parts until the color intermediate is in a state of colloidal dispersion, mixing a color intermediate complementary to the first with an equal quantity of rubber until the complementary color intermediate is in a state of colloidal dispersion, mixing the two batches thus prepared together and drying and sheeting the final mixture.

2. That process of producing a coloring compound for rubber manufactures which consists in mixing a color intermediate intimately with an equal quantity of rubber, mixing a color intermediate complementary to the first with an equal quantity of rubber, mixing the two batches thus prepared together drying and sheeting the final mixture.

In testimony whereof I affix my signature.

THEODORE G. SULLIVAN.